United States Patent [19]
Hatfield

[11] Patent Number: 4,536,113
[45] Date of Patent: Aug. 20, 1985

[54] AUTOMATIC JAW CONTROL FOR REVERSIBLE POWER TOOL

[76] Inventor: Jim J. Hatfield, 2723 Specles La., Redondo Beach, Calif. 90278

[21] Appl. No.: 490,857

[22] Filed: May 2, 1983

Related U.S. Application Data

[63] Continuation-in-part of Ser. No. 358,030, Mar. 15, 1982.

[51] Int. Cl.³ .................... B23Q 3/12; B23B 31/24
[52] U.S. Cl. .................... 409/234; 279/1 K; 279/60; 408/240
[58] Field of Search .......... 409/240, 234, 232; 279/60-65, 1 K, 1 ME, 1 S; 408/240, 241 R, 238

[56] References Cited
U.S. PATENT DOCUMENTS

| | | | |
|---|---|---|---|
| 3,506,277 | 4/1970 | Harms | 409/234 X |
| 4,274,642 | 6/1981 | Wunsch | 279/60 |
| 4,323,324 | 4/1982 | Eberhardt | 279/1 K |
| 4,395,170 | 7/1983 | Clarey | 279/1 K |

*Primary Examiner*—William R. Briggs
*Attorney, Agent, or Firm*—Charles H. Thomas

[57] ABSTRACT

In a reversible power tool, such as an electric drill, a clutch mechanism is coupled to selectively connect and disconnect a chuck jaw reciprocating means to advance and retract the jaws of a chuck or to allow the chuck jaw reciprocating means to be carried in rotation with the chuck jaws. According to the improvement the clutch mechanism is decoupled as the chuck jaws approach a position of complete retraction, despite actuation of a coupling mechanism which would otherwise prevent the chuck jaw reciprocating means and the chuck jaws from turning together in rotation. The decoupling mechanism prevents damage to the chuck which occurs in prior devices when the chuck jaws are driven longitudinally beyond the designed limit for complete chuck jaw retraction. Also, an annular workpiece holder is releasably secured to the chuck to hold a workpiece in axial alignment with the tool drive shaft to safeguard against accidental injury to the fingers of an individual operating the tool. The chuck is engaged with the drive shaft at a tapered interface, in addition to a conventional threaded connection. A means is provided for immobilizing the drive shaft relative to the tool housing to facilitate removal of the chuck.

5 Claims, 12 Drawing Figures

AUTOMATIC JAW CONTROL FOR REVERSIBLE POWER TOOL

This is a continuation-in-part of U.S. application Ser. No. 358,030, filed Mar. 15, 1982.

BACKGROUND OF THE INVENTION

1. Field of the Invention

The present invention relates to improved keyless chuck tightening and releasing mechanisms used in reversible electric drills and other reversible power tools which may be selectively equipped with alternative workpieces.

2. Description of the Prior Art

Prior U.S. patent application Ser. No. 358,030 describes a system for automatically advancing and retracting drill chuck jaws until resistance is encountered merely by actuation of the power tool motor. No separate manual actuation or manipulation of a chuck key or other removeable tool is required. A clutch mechanism is employed and is actuated at a mechanical advantage to prevent the sudden impact of engagement of clutch interface surfaces. The clutch mechanism of the prior device also is equipped with a spring washer, the force of which is overcome whenever too great a torque exists between the chuck propulsion barrel and the chuck guide. This prevents internal damage to the power tool, since otherwise the chuck jaws could be advanced to squeeze the drill bit until stress failure in the drill mechanism resulted.

One problem which was not recognized in the prior U.S. application Ser. No. 358,030 was that damage to the chuck mechanism can result if the jaws of the chuck mechanism are fully retracted with the full force of the rotary drive shaft. When the chuck jaws are retracted in this fashion, they can become jammed in the chuck.

SUMMARY OF THE INVENTION

The present invention is an improved reversible power tool which includes a clutch mechanism employing clutch interface means, such as teeth. A biasing means, such as a spring, urges the clutch interface teeth into disengagement. An actuable coupling mechanism is used to overcome the biasing spring and to move the clutch interface teeth into engagement at a mechanical advantage in response to movement of the clutch actuator.

According to the invention, a decoupling means is employed to force the clutch interface teeth into disengagement as the clutch jaws approach the completely retracted position, despite actuation of the coupling means. This avoids damage to the chuck mechanism which otherwise might occur with the coupling means actuated and with the rotary drive shaft driven at full power to retract the chuck jaws.

In a preferred embodiment of the invention the decoupling mechanism includes a rigid annular structure formed as a hollow piston directed at a longitudinally reciprocal element which carries the set of clutch teeth which are always immobilized from rotation relative to the power tool housing. The hollow piston includes a radial flange which extends into the longitudinal path of movement of the rearward extremities of the chuck jaws. The flange intercepts the chuck jaws as the chuck jaws approach the completely retracted position. As the chuck jaws are propelled to the rear, they bear against the flange to force the rigid, annular structure rearwardly, thereby forcing the clutch interface teeth into a condition of disengagement.

Preferably, the mechanism for moving the chuck jaws reciprocally includes both an end ring and a hollow barrel. The hollow barrel houses the rigid, annular decoupling device, as well as the biasing spring which normally urges the clutch teeth apart. The end ring and the hollow barrel are immobilized from rotation relative to each other by a key mechanism.

Another very advantageous feature of the invention is the provision of an annular workpiece holder. Since the power of the drill motor is used to advance and retract the chuck jaws, a considerable amount of torque will be applied to the workpiece if the jaws are closed on the workpiece at full power. While most reversible power tools also have the capability for varying speed, it is not normally unsafe for an individual to hold a workpiece, such as a drill bit, with his fingers until the workpiece is first seized lightly by the chuck jaws. The individual then removed his fingers from the workpiece, since it will thereupon begin to rotate.

Some individuals are not experienced in power tool operation. Such individuals might tend to grip the workpiece even after the workpiece has been seized by the chuck jaws. Although the sudden rotation of the workpiece normally causes the individual to release the workpiece from his fingers, minor injury, and conceivably even major injury, could result.

According to the present invention, a workpiece holder is provided which is releasably secured to the chuck. The workpiece holder includes a means for releasably holding the shank of a workpiece, such as a drill bit, in axial alignment with the drive shaft of the power tool and within radial alignment of the chuck jaws. Preferably, the workpiece holder includes an annular bonnet which is adapted to slip onto and frictionally engage the chuck, and an axial tube adapted to receive and releasably hold a workpiece. Preferably also, a magnet is positioned at the end of the tube remote from the bonnet, or otherwise to exert a magnetic field of attraction within the tube. In this way a steel workpiece, such as a drill bit or screwdriver tip, will be held by magnetic force within the workpiece holder until the chuck jaws seize the workpiece. Also, the workpiece holder can be slipped onto the chuck when the workpiece is to be released. When the clutch mechanism is actuated to retract the chuck jaws, the magnet will hold the steel workpiece within the workpiece holder.

In a preferred embodiment of the workpiece holder used to properly position a workpiece within the chuck jaws, the bonnet of the workpiece holder and the chuck are equipped with interengagable detent means. The detent means may take the form of inwardly directed radial protruberances within the bonnet which fit into depressions on the outer surface of the chuck. The tube of the workpiece holder includes an alignment means, such as a configured guide. Many screwdriver bits are of a non-circular, hexagonal cross section. To accomodate such bits, the alignment means includes a corresponding hexagonal opening which receives a workpiece at a predetermined angular disposition within the tube. The alignment means and the detent means are located relative to each other to hold a workpiece at a predetermined angular orientation relative to the chuck jaws. In this way, the chuck jaws close on the flat surfaces of the outer hexagonal prismatic shape of the screwdriver bit. Without a workpiece holder such as this, the chuck jaws might well close on the edges of the screwdriver bit. During operation, torque might well be imparted to the screwdriver bit so that the jaws would slip off of the edges and the workpiece would come loose within the rotating chuck. However, with the workpiece holder according to the invention, proper alignment of a workpiece of non-circular cross section relative to the chuck jaws is assured.

A further feature of the preferred embodiment of the invention relates to the manner of attachment and release of the chuck relative to the power tool drive shaft. Preferably, the power tool drive shaft is tapered at its terminal extremity and has a threaded tip, normally a left-handed tip. The power tool chuck has an axial well with an open end and a blind end defined therein. The axial well in the chuck is interiorally tapped at its blind end for threadable engagement with the shaft tip. The well in the chuck is tapered at its open end to receive the tapered drive shaft in mating, frictional engagement. The interfacing surfaces of frictional engagement between the drive shaft and the chuck are therefore of frusto-conical configuration. This manner of engagement allows the chuck to be secured to the drive shaft so that quite a large force is required to remove the chuck from the drive shaft.

To enable the application of sufficient force to allow removal of the chuck, the drive shaft includes a transverse, radial opening. The drill housing normally includes a body and a nose extension which is securable to the body by radially directed screws passing therethrough. According to the invention, the transverse, radial opening in the drive shaft is arranged in longitudinal alignment with at least one of these screws securing the drill housing nose extension to the drill housing body. With the longitudinally aligned screw removed, a locking rod can be radially inserted through the wall of the drill housing and into the radial opening in the drive shaft. The drive shaft is thereby immobilized relative to the drill housing so that the chuck can be rotated and removed from the drive shaft for servicing.

Since the drill could be badly damaged if the drill motor were operated with the immobilizing rod inserted into the transverse opening in the drive shaft, manufacturers may well choose to avoid disclosing the technique for chuck removal in the operating instructions distributed with the drill. Because access to the transverse opening in the drill shaft is through a threaded aperture from which a screw has been removed, the transverse opening in the drive shaft is not easily discoverable by the uninformed. A chance discovery could only occur if the proper screw holding the drill body nose extension to the drill body housing is removed and if, at the same time, the transverse opening in the drive shaft is radially aligned with the tapped opening in the drill body. Construction of a drill according to this aspect of the invention thereby provides a significant safety feature to prevent removal of the chuck from the drive shaft by the inexperienced, yet greatly facilitates removal by competent servicing personnel.

The invention may be described with greater clarity and particularity by reference to the accompanying drawings.

DESCRIPTION OF THE DRAWINGS

FIG. 5 is a transverse sectional view taken along the lines 5—5 of FIG. 2.

FIG. 6 is a transverse sectional view taken along the lines 6—6 of FIG. 2.

FIG. 7 is a transverse sectional view taken along the lines 7—7 of FIG. 2.

FIG. 12 is an alternative embodiment of a workpiece holder according to the invention.

DESCRIPTION OF THE EMBODIMENTS

Figure 1:
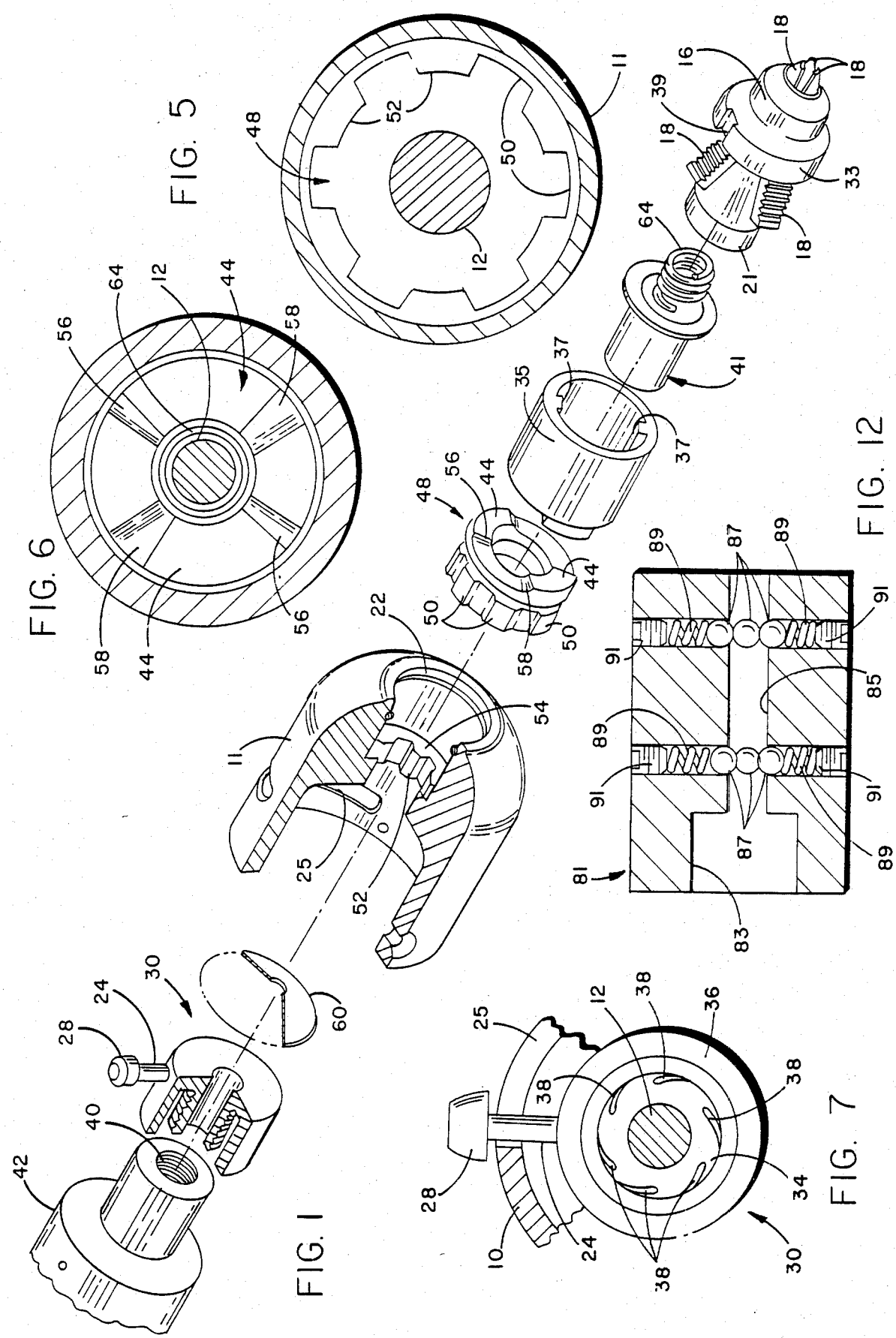
FIG. 1 is an exploded perspective view of one embodiment of the improved clutch mechanism in an electric drill according to the invention.

A reversible power tool, such as a drill, includes a drill housing 10. The drill body nose extension 11 is mounted upon the body 13 of the drill housing 11 by means of three machine screws 68 seated within counter sunken recesses in the nose housing extension 11. The machine screws 68 are threadably engaged in radial, tapped apertures through the wall of the drill housing body 13.

Figure 2:
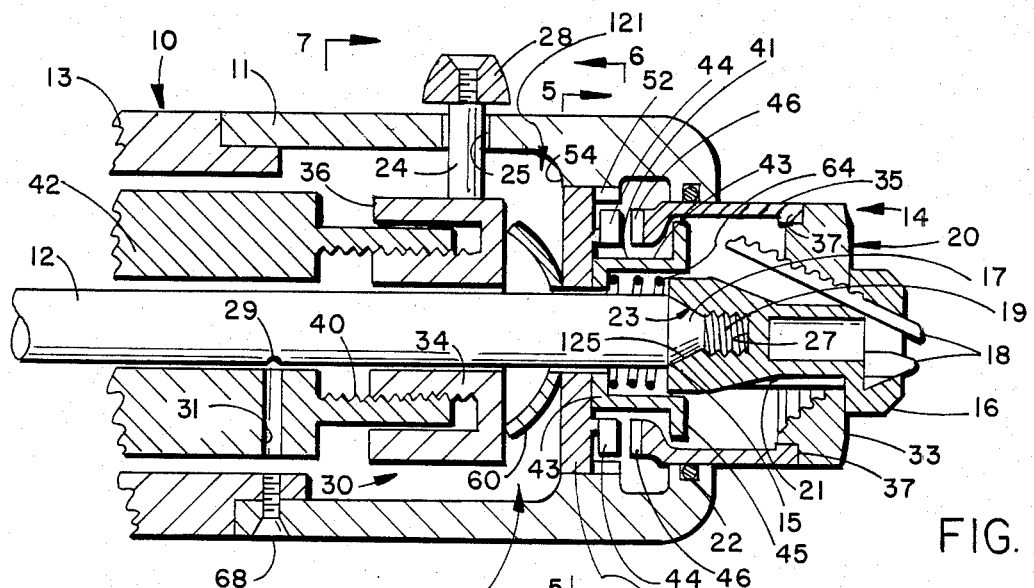
FIG. 2 is an elevational sectional view taken along the drill drive shaft axis of the embodiment of FIG. 1 showing the clutch interface mechanism thereof disengaged.
Figure 3:
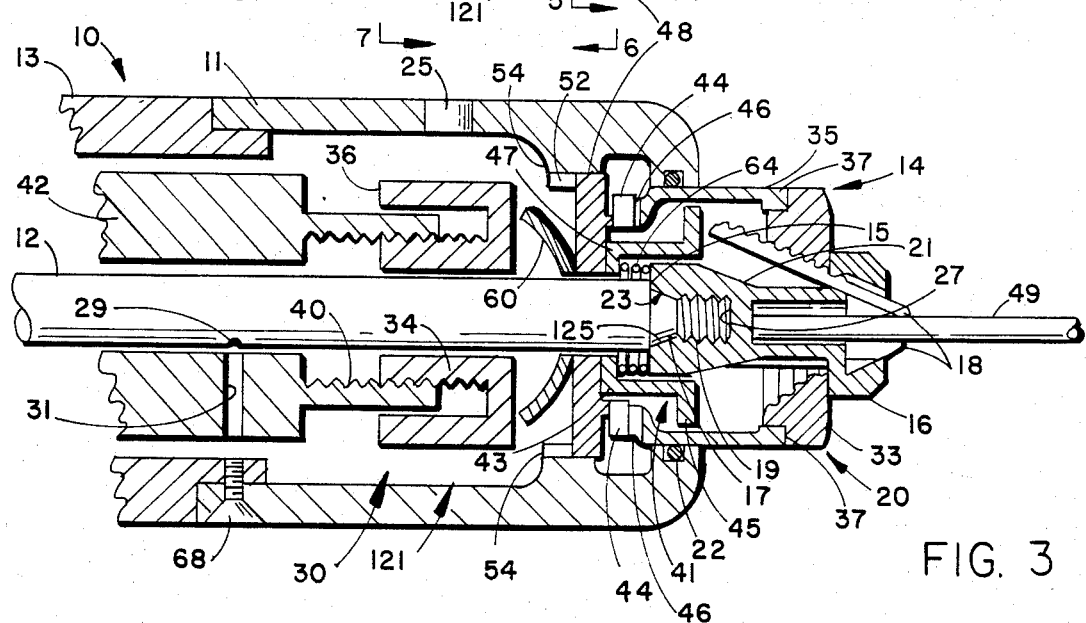
FIG. 3 is a side sectional elevational view of the embodiment of FIG. 1 showing the coupling mechanism engaged to engage the clutch mechanism.
Figure 4:
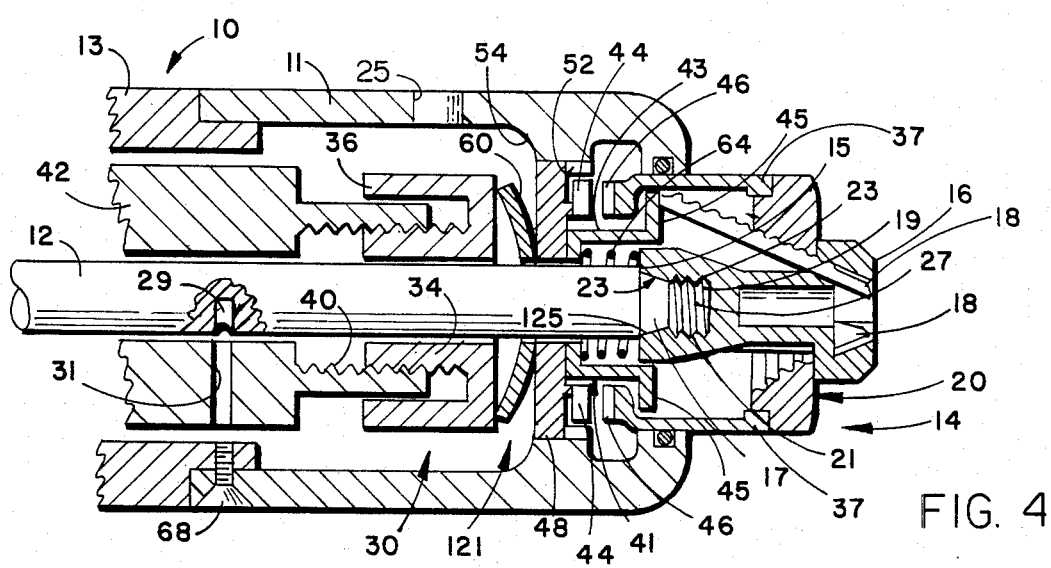
FIG. 4 is a side sectional elevational view of the embodiment of FIG. 1 showing the clutch mechanism decoupled from engagement by the chuck jaws as they approach a completely retracted position, despite actuation of the coupling mechanism.

The reversible drill of the invention has a rotary drive shaft 12, visible in FIGS. 2-4. The projecting extremity of the drive shaft 12 terminates in a radial bearing ledge 15. Radially, inwardly from the bearing ledge 15 the tip of the drive shaft 12 extends in a tapered, smooth, frusto-conical surface 17. The tip 19 of the drive shaft 12 is threaded, preferably with right hand threads.

The chuck 14 has a generally mushroom shaped jaw guide 16 with a rearwardly extending stem 21. The stem 21 of the chuck 14 has an axial well 23 in its rearwardly facing surface. The well 23 has an open end 125 and a blind end 27. The well 23 is interiorly tapped at the blind end 27 for threadable engagement with the threaded tip 19 of the drive shaft 12. The well 23 is tapered at the open end 125 to receive the tapered drive shaft extremity. The mutually facing frusto-conical surfaces 17 and 125 reside in frictional engagement and increase the force necessary to remove the chuck 14 from the drive shaft 12. The force of engagement between the terminal extremity of the drive shaft 12 and the chuck 14 is enhanced by the abutting relationship of the rearwardly facing surface of the stem 21 of the jaw guide 16 against the bearing ledge 15 on the drive shaft 12.

The interconnection between the drive shaft 12 and the chuck 14 significantly reduces the likelihood that the chuck 14 will, with time, work loose from the drive shaft 12.

It would be extremely difficult to dislodge the chuck 14 from the drive shaft 12 in the absence of another feature of the present invention. Specifically, the drive shaft 12 is equipped with a transverse, radial opening 29 arranged in longitudinal alignment with at least one of the screws 68 which secures the drill housing nose extension 10 to the drill housing body 13. The transverse opening 29 takes the form of a radial bore extending about half way through the drive shaft 12, as best depicted in FIG. 4. To remove the chuck 14 it is necessary for the apertures in the housing nose extension and housing body, normally occupied by the machine screws 68, to be in longitudinal alignment with the opening 29. A radial bore 31 must also be defined through the wall of the annular nose extension collar 42 which is securely attached to the drill housing 11. The bore 31 is in longitudinal and radial alignment with one of the tapped apertures normally occupied by a machine screw 68. The bore 31 is in longitudinal alignment with the bore 29 in the drive shaft 12, and is in radial alignment with that bore when the drive shaft 12 is rotated to the position depicted in FIGS. 2–4.

To remove the chuck 14 from the drill housing 10 the screw 68, visible in FIGS. 2–4, is removed. A locking rod which fits through the tapped apertures in the drill housing nose extension 11 and the drill housing body 13 and through the bore 31 and into the opening 29, is radially inserted until it seats in the bottom of the bore 29. Power should be disconnected from the drill before the locking rod is inserted to eliminate the possibility that the drill motor might be actuated with the locking rod extending radially from the drill housing 10 and into the bore 29 of the drive shaft 12.

With the locking rod in position, the jaw guide 16 is rotated to threadably disengage the threaded tip 19 of the shaft 12 from the tapped blind end 27 of the well 23 in the stem 21. To reinstall the chuck 14, a reverse procedure is used. That is, the stem 21 of the jaw guide 16 is engaged with the threaded tip 19 of the drive shaft 12. The jaw guide 16 is tightened until the frusto-conical surfaces 17 and 125 reside in mutual frictional engagement and the rearward end of the stem 21 resides in abutting relationship on the bearing ledge 15. The resultant combination of forces securely locks the chuck 14 onto the drive shaft 12.

The chuck 14 includes three bar-like jaws 18 arranged at equal intervals around the opening in the front of the chuck guide 16. The chuck jaws 18 are disposed in inclined orientation relative to the extension of the axis of rotation of the drive shaft 12. The outwardly directed surfaces of the jaws 18 are threaded. A chuck jaw propelling or reciprocating mechanism 20 includes an annular end ring 33 which is internally threaded to engage the outwardly directed threads on the jaws 18.

A clutch mechanism 121 is employed to effectuate grasping and release of a workpiece by the jaws 18 of the reversible drill. The clutch mechanism 121 operates to ease the chuck jaw reciprocating or propelling mechanism 20 into and out of engagement relative to the drill housing 10. When the chuck jaw propelling mechanism 20 is gradually drawn into engagement with structure which is immobilized relative to the drill housing 10, it is restrained from rotation relative to the drill housing. Since the chuck jaw propelling mechanism 20 is then locked or restrained from rotating relative to the drill housing 10, activation of the drill motor and the drive shaft 12 will rotate the jaw guide 16 but not the chuck jaw propelling mechanism 20. Depending upon the direction of rotation of the drive shaft 12 the jaws 18 will be advanced or retracted. When the chuck jaw propelling mechanism 20 and the housing 10 are gradually drawn or eased apart, the chuck jaw propelling mechanism 20 is released and is free to rotate with the chuck jaw guide 16. Both the chuck jaw propelling mechanism 20 and the jaw guide 16 can then be driven in rotation by the drive shaft 12 upon actuation of the drill motor and there is no relative rotation therebetween, except that which may be caused by the motion retarding O-ring 22. The function of the O-ring 22 is described in the prior U.S. patent application Ser. No. 358,030.

The clutch mechanism 121 includes a clutch actuator which has a radial lever arm 24 that protrudes through a spiral slot 25 formed in the drill housing nose extension 11. The protruding extremity of the lever arm 24 has attached thereto a plastic knob 28 which the drill user can manually manipulate. The inner extremity of the lever arm 24 terminates in an annular clutch coupling mechanism including a bearing collar 30, best depicted in FIG. 1 and 7. The bearing collar 30 has an interior, annular, tube-like track follower 34 about which a surrounding annular sleeve 36 is coaxially mounted a spaced distance therefrom. The radially outer surface of the track follower 34 is formed with six male, spiral threads 38 thereon, as illustrated in FIG. 7. The threads 38 are in mesh with corresponding female threads 40 on the annular nose extension collar 42 which is immobilized relative to the drill housing 10.

The clutch mechanism 121 also includes first and second sets of opposing teeth 44 and 46, respectively, which form a clutch interface mechanism. Both of the sets of teeth 44 and 46 are disposed about a common axis coaxial with the drive shaft 12 in longitudinally facing relationship.

The first set of teeth 44 is best visible in FIGS. 1, 2, 4 and 6. The teeth 44 are axially directed toward the chuck jaw propelling mechanism 20 and are formed upon an annular, axially reciprocal, impact tooth carrier 48. The impact carrier 48 has radial crenelations 50 formed upon its outer surface, as depicted in FIG. 5. The crenelations 50 mate with corresponding crenelations 52 which define an axial opening in a transverse partition 54 within the drill housing nose extension 11, as illustrated in FIGS. 1 and 5. The purpose of the interengageable crenelations 50 and 52 is to form a means for immobilizing the first set of teeth 44 from rotation relative to the drill housing 10 which will allow axial, reciprocal movement of the impact tooth carrier 48 relative to the partition 54. The impact tooth carrier 48 serves as a means for bringing the first set of teeth 44 and the second set of teeth 46 into and out of mutual engagement.

The teeth 46 in the second set of teeth are formed on the rearwardly facing surface, in longitudinally directed fashion, of the hollow barrel 35 of the chuck 14. The structure of the barrel 35 serves as a means coupling the second set of teeth 46 to rotate with the chuck jaw reciprocating mechanism 20. A key mechanism includes diametrically opposed longitudinally extending keys 37 projecting inwardly from the open end of the barrel 35, as depicted in FIG. 1. Corresponding longitudinally extending channels 39 are defined in the outer surface of the end ring 33. When the end ring 33 and the barrel 35 are assembled as depicted in FIGS. 2, 3 and 4, the interengaged keys 37 and channels 39 immobilize the ring 33 and the hollow barrel 35 from rotation relative to each other.

The opposing teeth 44 and 46 have first bearing surfaces 56 which are engageable with each other. The bearing surfaces 56 of the teeth 44 are visible in FIGS. 1 and 6. The bearing surfaces 56 are engaged upon rotation of the drive shaft 12 in one direction to retract the chuck jaws 18. The teeth 44 and 46 also have a second set of bearing surfaces 58 engageable with each other upon rotation of the drive shaft 12 in the opposite direction to advance the chuck jaws. The bearing surfaces 56 and 58 are configured so that the upper limit of torque in retracting the chuck jaws 18 is greater than the upper limit of torque for advancing the chuck jaws 18, as described in prior U.S. patent application Ser. No. 358,030.

The chuck mechanism 121 also includes an annular torque limiting curved steel spring washer 60 disposed about the drive shaft 12 immediately forward from the bearing collar 30. The spring washer 60 serves as a torque limiting means interposed between the clutch actuating lever 24 and the first set of teeth 44.

A coil spring 64 is disposed coaxially about the drive shaft 12 in enclosed fashion within the barrel 35. The coil spring serves to bias the first and second sets of teeth 44 and 46, respectively, apart. The coil spring 64 thereby urges the first set of teeth 44 rearward so that the impact tooth carrier 48 drives the bearing collar 30 toward the end of the spiral track remote from the chuck jaw propelling ring 20. This tends to rotate the clutch actuating lever arm 25 counterclockwise to the position depicted in FIGS. 2 and 7.

A principal advantage of the present invention over the prior U.S. patent application Ser. No. 358,030 is the provision of a decoupling means for forcing the clutch interface teeth 44 and 46 into disengagement as the chuck jaws 18 approach a completely retracted position despite actuation of the coupling bearing collar 30 by means of the lever arm 24, as depicted in FIG. 4. The decoupling function of the invention is performed by a rigid annular structure 41, shaped in the form of a longitudinally oriented top-hat and depicted in isolation in FIG. 1. The rigid annular structure 41 has a central cylindrical annular structure 43 formed as a hollow piston directed at the longitudinally reciprocal impact tooth carrier 48. The rigid annular structure 41 also includes a radial flange 45 extending into the longitudinal path of movement of the chuck jaws 18, as depicted in FIG. 4. The biasing spring 64 is disposed about the rotary drive shaft 12 and interposed between the hollow piston 43 and the chuck jaw guide 16.

The decoupling structure 41 is disposed about the rotary drive shaft 12 and interposed between the chuck jaws 18 and the longitudinally reciprocal impact tooth carrier 48. The annular flange 45 of the decoupling structure 41 is intercepted by the chuck jaws 18 as the chuck jaws 18 approach the completely retracted position, as depicted in FIG. 4, so that the chuck jaws 18 bear against the flange 45 to force the clutch interface teeth 44 and 46 into disengagement through the rigid annular decoupling structure 41, as depicted in FIG. 4. The barrel 35 of the chuck 14 encircles the rigid annular decoupling structure 41 and encloses the biasing spring 64. The biasing spring 64 bears against the transverse end surface of the jaw guide 16 and against the radially inwardly directed flange 47 of the piston 43. The biasing spring urges the piston 43 longitudinally rearward to extend past the second set of teeth 46 when the lever arm 24 is in the position of FIG. 2.

Actuation of the clutch mechanism 121 to seize or release a workpiece, such as a drill bit, commences with the clutch component in the position depicted in FIG. 2. From the position of FIG. 2, the clutch actuating lever 24 is rotated in the spiral slot 25 in the drill housing nose extension 11. As the lever 24 is moved spirally forward, it rotates the bearing collar 30 about the drive shaft 12 upon which the bearing collar 30 is coaxially disposed. The bearing collar 30 rides on a spiral track formed by the interengaged spiral threads 38 and 40 on the tubular track follower 34 and nose extension collar 42 respectively.

As the clutch actuating lever arm 24 is rotated clockwise, as viewed in FIG. 7, it advances the bearing collar 30, by means of its coupling thereto, toward the opposite end of the spiral track which is the end closest to the jaw propelling ring 33. As the bearing collar 30 advances by manual manipulation of the lever arm 24, it overcomes the force of the biasing spring 64. Complete rotation of the lever arm 24 throughout the length of the slot 25 compresses the biasing spring 64, overcoming its force, and forces the first and second sets of teeth 44 and 46 into mutual engagement, as depicted in FIG. 3. With the teeth 44 and 46 engaged, the chuck jaws 18 will be advanced or retracted, depending upon the direction of rotation of the drive shaft 12, until resistance is encountered.

As resistance to advancement or retraction of the chuck jaws 18 increases, torque builds in the clutch mechanism 121. If the chuck jaws 18 are advanced, ultimately the torque developed in the clutch mechanism 121 will be sufficient to overcome the spring force of the spring washer 60. As a result, the spring washer 60 will be compressed sufficiently to allow the teeth 44 and 46 to slip past each other. FIG. 3 depicts the chuck jaws 18 tightened upon a drill bit 49. If lever arm 24 is held forward to force the teeth 44 and 46 toward each other, ultimately the resistance to further advancement of the jaws 18 will cause the impact tooth carrier 48 to move to the left, as viewed in FIG. 3, to compress the spring washer 60 and allow the teeth 44 and 46 to slide past each other.

If the actuating lever 24 is moved clockwise, as viewed in FIG. 7, and the chuck jaws 18 are retracted by reversing the direction of rotation of the drive shaft 12, the chuck jaws 18 will move rearwardly to the position depicted in FIG. 4. Without the decoupling structure 41, the chuck jaws 18 could be driven rearwardly with a very large force. The chuck jaws 18 could be bent so that they might well jam and fail to properly engage the teeth of the chuck jaw propelling ring 33. To avoid this condition, as the chuck jaws 18 retract to within approximately one-eighth inch of their fully retracted position, they establish contact with the flange 45 of the decoupling structure 41. Further rearward movement of the jaws 18 forces the decoupling structure 41 rearwardly, thereby compressing the spring washer 60 and forcing the impact tooth carrier 48 rearwardly relative to the partition 54. The first and second sets of teeth 44 and 46, respectively, are thereby forced out of engagement and damage to the chuck 14 is avoided.

Figure 8:
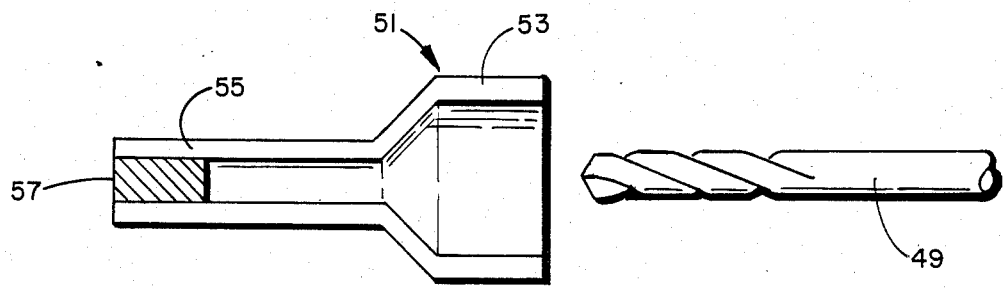
FIG. 8 is a transverse sectional view showing use of one embodiment of a workpiece holder according to the invention.

FIGS. 8-12 illustrate a further aspect of the improved reversible power tool of the invention. FIG. 8 illustrates an annular workpiece holder 51, preferably formed of plastic or some other inexpensive material. The workpiece holder 51 includes an annular, cup-shaped bonnet 53 adapted to slip on to and frictionally engage the head of the chuck jaw guide 16. The bonnet 53 narrows to an axial tube 55 which is adapted to receive and releasably hold a workpiece, such as the drill bit 49 depicted in FIG. 8. The end of the tube 55 is plugged by a magnetic slug 57 which maintains a magnetic field of attraction within the tube 55. The slug 57 is located at the end of the tube 55 opposite the bonnet 53.

To utilize the workpiece holder 51, the drill bit 49 is inserted cutting end first into the workpiece holder 51. The tip of the drill bit 49 is attracted to the magnetic slug 57. The bonnet 53 is then slipped over the head of the chuck guide 16, and the clutch mechanism 121 is actuated as previously described to advance the chuck jaws 18 until they grip the shank of the drill bit 49.

Using the workpiece holder 51 it is unnecessary for the drill operator to touch the drill bit 49 when the motor is actuated. Moreover, by employing the workpiece holder 51 both hands of the drill operator are free so that the operator can push the actuating lever 24 with one hand and press the drill motor trigger with the other hand. The drill bit 49 is held in an axial position so that it can be readily seized by the chuck jaws 18.

In a similar manner, the workpiece holder 51 can be utilized to remove a workpiece from the drill. With the drill bit 49 grasped in the chuck jaws 18, the workpiece holder 51 is inserted over the end of the drill so that the cutting end of the drill 49 extends into the tube 55 and the bonnet 53 fits over the head of the chuck jaw guide 16. The clutch mechanism 121 and the drill motor are actuated to release the drill bit, which is thereupon attracted to the magnetic slug 57. The workpiece holder 51 carries the drill bit 49 with it as the bonnet 53 is slipped off of the chuck jaw guide 16.

Figure 10:
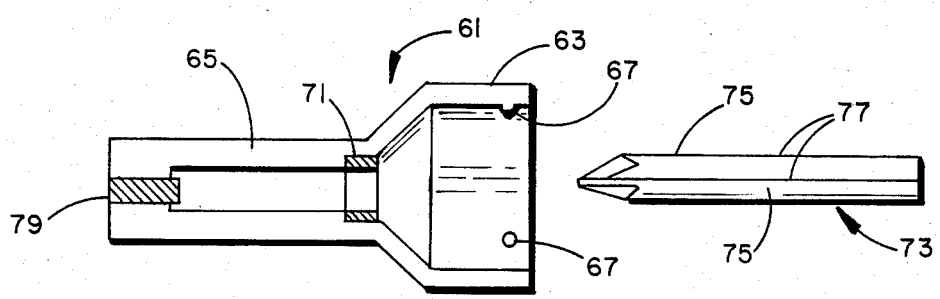
FIG. 10 is a sectional elevational view showing insertion of a workpiece into the embodiment of FIG. 9.
Figure 11:
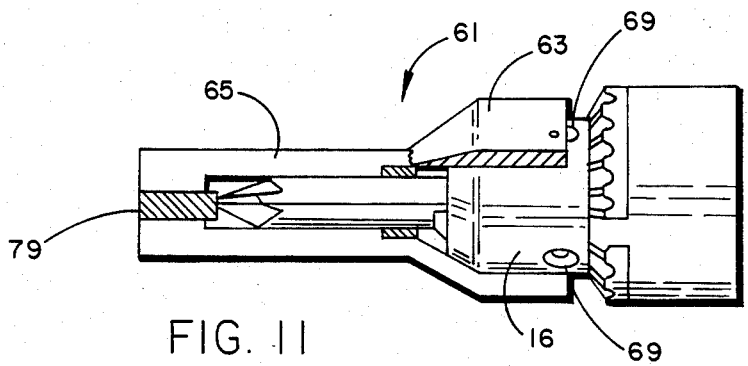
FIG. 11 illustrates the manner in which the workpiece holder of FIG. 9 is employed with a power tool according to the invention.
Figure 9:
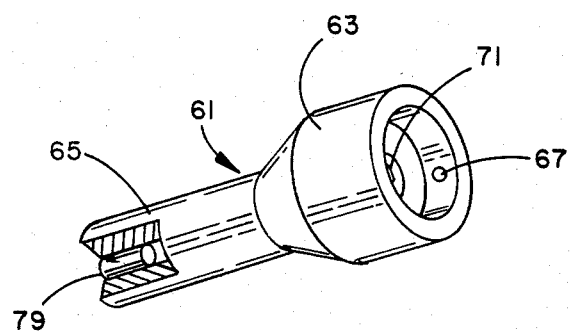
FIG. 9 is a perspective view of an alternative embodiment of the workpiece holder according to the invention.

FIGS. 9 through 11 illustrate a modified form of the workpiece holder of the invention. The workpiece holder 61 includes a bonnet 63 and an axial tube 65 of the type described. However, the workpiece holder 61 is adapted for use with workpieces of non-circular cross section. The workpiece holder 61 is equipped with interengageable inwardly projecting detent protrusions 67. Three inwardly directed detent protrusions 67 are arranged about the inner circumference of the bonnet 63 at the open end thereof which fits onto the head of the chuck guide 16. The detent protrusions 67 are received within corresponding detent depressions 69 defined on the outer surface of the head of the chuck jaw guide 16. The detent depressions 69 are illustrated in FIG. 11.

At the transition between the tube 65 and the bonnet 63 an alignment means is provided in the form of an annular guide 71. The guide 71 is a disc formed of metal with an axial, non-circular, configured aperture defined therein. Typically, the aperture is of hexagonal cross-sectional configuration adapted to receive the hexagonal shaped shank of a workpiece, such as the Phillips head screwdriver bit 73 depicted in FIG. 10. The screwdriver bit 73 fits into the workpiece holder 61 and must be oriented to pass through the guide 71 into the tube 65. The guide 71 thereby serves to align the screwdriver bit 73 at a proper angular orientation relative to the detent protrusions 67. Since the detent protrusions 67 are aligned with the detent recesses 69 when the workpiece holder 61 is properly fitted onto the chuck jaw guide 16, as depicted in FIG. 11, the screwdriver bit 73 is held at a predetermined angular orientation relative to the chuck jaws 18. More specifically, the screwdriver bit 73 is held so that the chuck jaws 18 can only close upon the flat surfaces 75 of the drill bit 73, and not upon the ridges 77 thereof. As a consequence, the workpiece holder 61 ensures that the drill bit 73 is properly seized by the chuck jaws 18 and will not come loose when the drill is operated. As with the workpiece holder 51, the workpiece holder 61 includes a magnetic slug 79 to attract the steel drill bit 73.

FIG. 12 illustrates a further embodiment of the workpiece holder of the invention. The workpiece holder 81 depicted in FIG. 12 is designed for use with workpieces which can vary considerably in diameter. The workpiece holder 81 is formed of plastic and includes a mouth 83 which is releasably securable to the chuck jaw guide 16 in the manner previously described. The workpiece holder 81 also includes two sets of centering mechanisms to maintain a workpiece inserted into the tubular opening 85 aligned along the axial center of the drive shaft 12 and within radial alignment with the chuck jaws 18.

The centering mechanisms are formed of four radial bores located 90 degrees apart and directed through the structure of the workpiece holder 81. The diameter of the opening of each of the bores into the longitudinal tube 85 is smaller than the nominal diameter of each of the radial bores. Nylon spheres 87 partially project into the tube 85 and are biased toward the axis of the tube 85 by means of small coil springs 89 disposed within each of the radial bores. Misalignments can be corrected by means of set plugs 91 which hold the springs 89 and spheres 87 within the radial bores. The set plugs 91 are threadably engaged in the tapped radial bores and can be advanced or retracted to ensure that a workpiece is held by the two sets of spheres 87 at a precise axial alignment.

Workpieces of differing diameters can be inserted into the tube 85. The springs 89 will cause the spheres 87 to close upon narrow, cylindrical workpieces, while larger diameter workpieces will overcome the bias of the springs 89 and urge the spheres 87 radially outwardly.

The workpiece holder 81 releasably holds a workpiece, such as a drill bit or a screwdriver bit, in axial alignment with the drive shaft 12. The centering biasing mechanisms formed by the spheres 87, springs 89 and set plugs 91, act in opposition to each other to receive workpieces of differing diameters within the tube 85, while ensuring that a workpiece inserted into the workpiece holder 81 is maintained centered in axial alignment with the shaft 12.

Many reversible drill chuck guides 16 have heads which are one inch in diameter. Accordingly, the mouth 83 of the workpiece holder 81 should likewise be formed with nominal diameter of one inch. The mouth 83 should extend 0.650 inches into the structure of the workpiece holder 81 with the tube 85 extending throughout the remaining length of the workpiece holder 81. Preferably, the workpiece holder 81 is two inches overall in diameter. The tube 85 is preferably about 0.400 inches in diameter, while the wall thickness of the structure at the mouth 83 is preferably about 1.3 inches in diameter.

Undoubtedly, numerous other variations and modifications of the invention will become readily apparent to those familiar with workshop power tools. Accordingly, the scope of the invention should not be considered limited to the particular embodiments depicted and described, but rather is defined in the claims appended hereto.

I claim:

1. In a reversible power tool having a rotary drive shaft carried by a drill housing and having a chuck engageable for rotation with said drive shaft and formed with a jaw guide, chuck jaws constrained by said jaw guide for radial advancement and retraction relative to the axis of said drive shaft, chuck jaw reciprocating means journaled relative to said jaw guide, and coupled to said chuck jaws to selectively advance and retract said chuck jaws between completely advanced and completely retracted positions when said chuck jaw reciprocating means and said jaw guide are subjected to relative rotation in opposite directions, and manually actuable clutch means for engaging and disengaging said chuck jaw reciprocating means relative to said drill housing to respectively allow and prevent relative rotation between said jaw guide and said chuck jaw reciprocating means, wherein said clutch means includes a clutch actuator mounted for movement relative to said drill housing, clutch interface means for engaging said drill housing to said chuck jaw reciprocating means, biasing means urging said clutch interface means into disengagement and actuable coupling means for overcoming said biasing means and moving said clutch interface means into engagement at a mechanical advantage by said clutch actuator, the improvement comprising decoupling means for forcing said clutch interface means into disengagement as said chuck jaws approach said completely retracted position despite actuation of said coupling means.

2. A reversible power tool according to claim 1 wherein said clutch interface means includes first and second sets of opposing teeth disposed about a common axis, longitudinally reciprocal means for bringing said first and second sets of teeth into and out of engagement, means for immobilizing said first set of teeth from rotation relative to said drill housing, means coupling said second set of teeth to rotate with said chuck jaw reciprocating means, and said decoupling means is comprised of a rigid, annular structure disposed about said rotary drive shaft and interposed between said chuck jaws and said longitudinally reciprocal means and including means which is intercepted by said chuck jaws as said chuck jaws approach said completely retracted position so that said chuck jaws bear thereagainst to force said clutch interface means into disengagement through said rigid annular structure.

3. A reversible power tool according to claim 2 wherein said rigid, annular structure is formed as a hollow piston directed at said longitudinally reciprocal means and including a radial flange extending into the longitudinal path of movement of said chuck jaws, and said biasing means is a spring disposed about said rotary drive shaft and interposed between said hollow piston and said jaw guide.

4. A reversible power tool according to claim 3 wherein said chuck jaw reciprocating means includes an end ring and a hollow barrel having a forward end adapted to receive said end ring, and a rearward end bearing said second set of teeth in longitudinally directed fashion, and the structure of said barrel serves as said means coupling said second set of teeth to rotate with said chuck jaw reciprocating means, and said barrel encircles said rigid annular structure and encloses said biasing means, and said biasing means urges said piston longitudinally rearward to extend past said second set of teeth.

5. A reversible power tool according to claim 4 in which a key mechanism immobilizes said end ring and said hollow barrel from rotation relative to each other.

* * * * *